Patented June 30, 1953

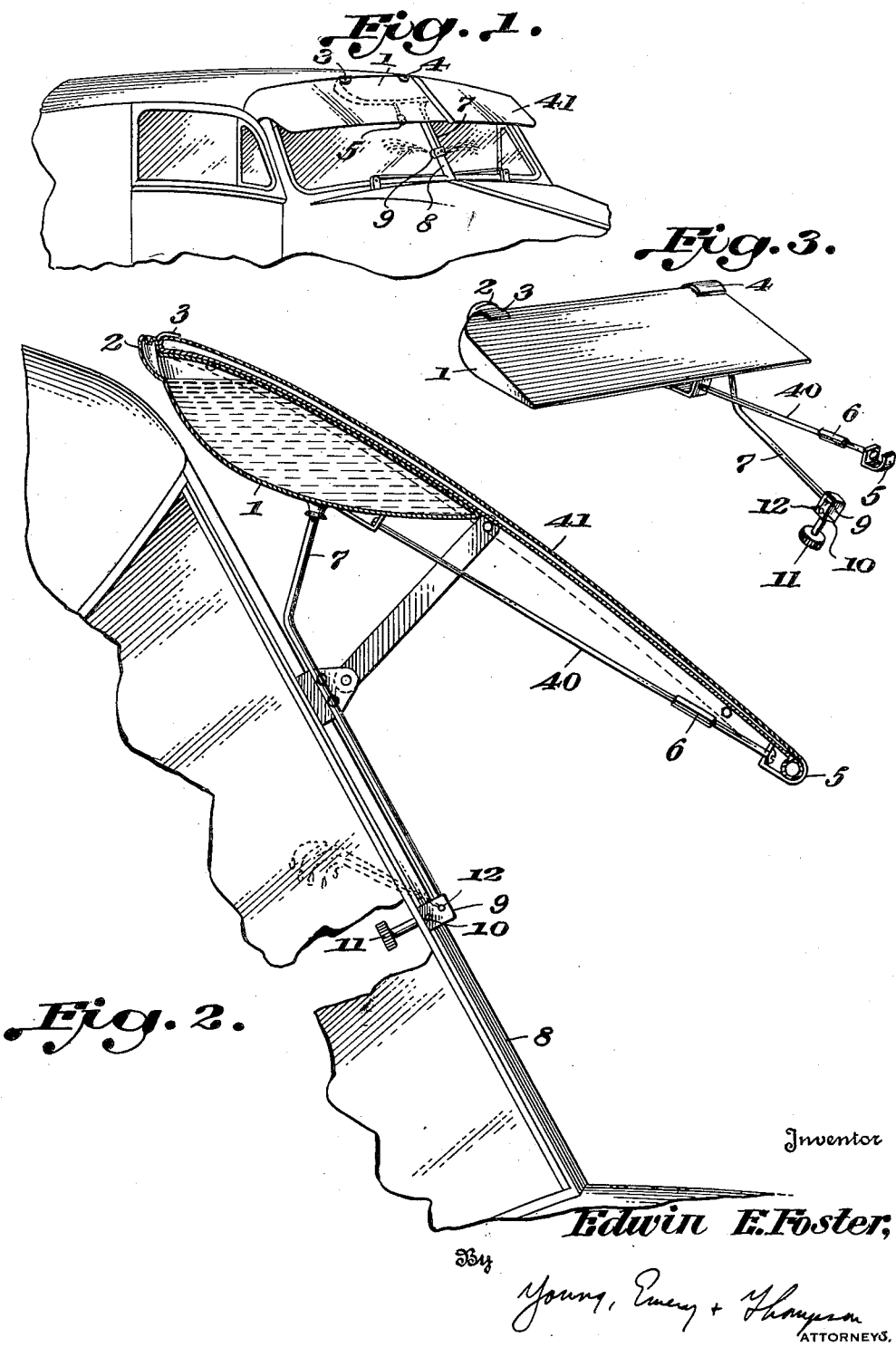

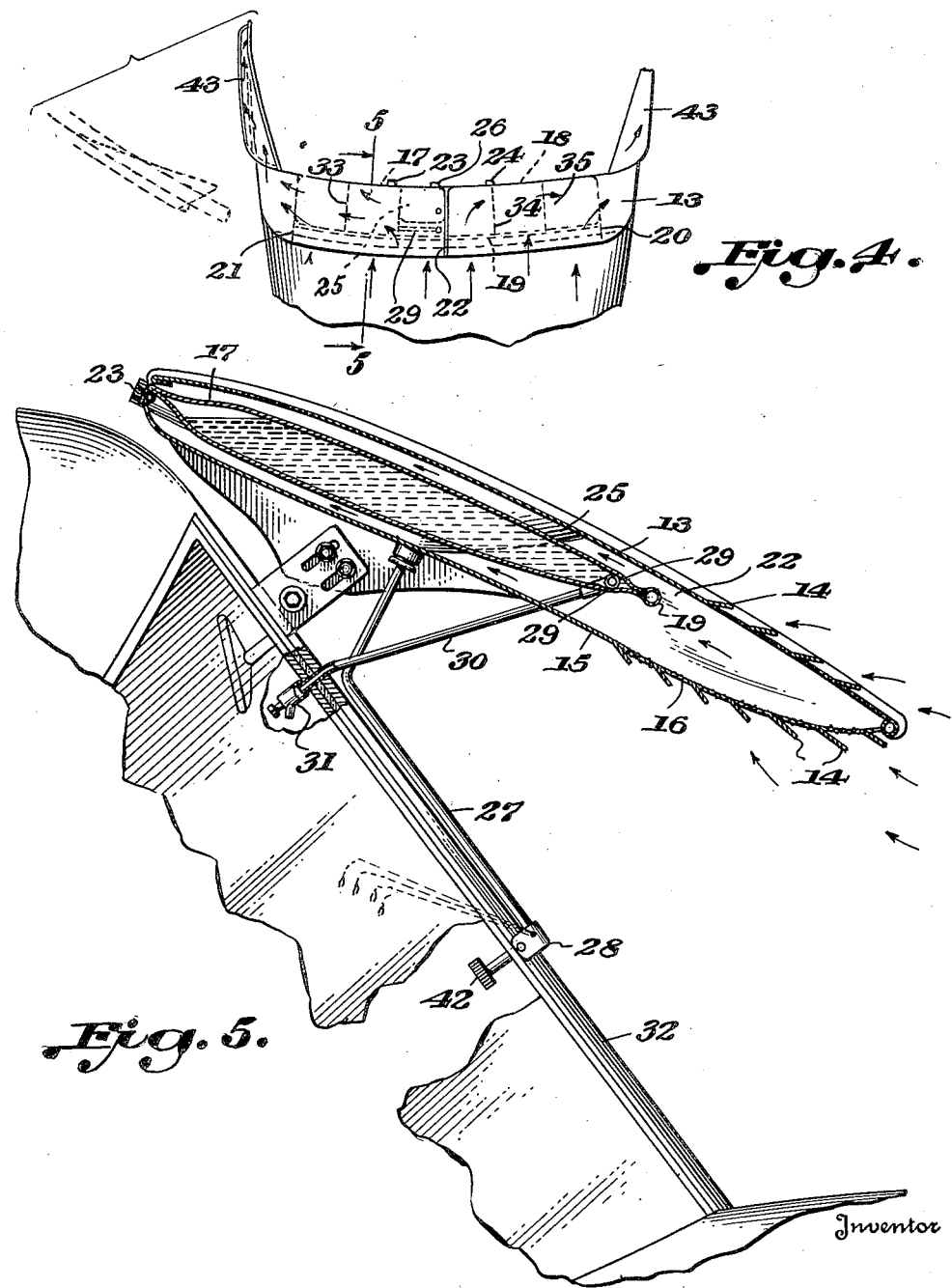

2,643,909

UNITED STATES PATENT OFFICE 2,643,909

COMBINED WINDSHIELD VISOR AND WASHER

Edwin E. Foster, Austin, Tex.

Application October 29, 1948, Serial No. 57,246

6 Claims. (Cl. 296—95)

This invention relates to sun visors and the like for automobiles and the like and more particularly to a visor having a water reservoir to be used for cleaning the windshield.

It is an object of the invention to provide an attachment for a sun visor in the form of a water reservoir with means to connect the reservoir with a valve adjacent to the windshield. Another object resides in a sun visor having combined functions as a water reservoir for cleaning the windshield, a water reservoir for cooling air and a water reservoir for drinking purposes. A still further object of the invention resides in a combined windshield visor and air cooling system with means to hold a water reservoir for drinking purposes and a water reservoir for windshield cleaning purposes.

Further objects will be apparent from the following description when considered in connection with the accompanying drawings in which;

Figure 1 is a perspective view of a sun visor on an automobile showing a water reservoir for cleaning the windshield attached thereto, Figure 2 is a cross section of the visor and reservoir of Figure 1, Figure 3 is a perspective view of the water reservoir and attachments, Figure 4 is a top plan view of a modified structure, and Figure 5 is a cross section of the visor taken on line 5—5 of Figure 4.

Figures 1 to 3 show a windshield washer attachment in which Figure 3 shows the device to be applied to a windshield visor and includes a water reservoir 1 which may be made of any suitable material such as aluminum, rubber, steel, plastic or glass. The reservoir is provided with a filler cap 2, which is preferably made of rubber, which will normally stay closed but which can be forced open by inserting a water hose spout, not shown, which is normally used at filling stations. The reservoir 1 is provided with two hooks or lugs 3 and 4 on the back edge corners of the reservoir. A third hook 5 is provided with a turnbuckle 6 and is designed to hook over the front edge of the visor. By tightening the turnbuckle 6 the reservoir becomes firmly attached by means of a tension rod 40 to any type of visor 41 and the only visible parts are the three thin clamps 3, 4, and 5. As shown in Fig. 2 a small tube 7 extends from the reservoir 1 down a center parting strip 8 to a point on the parting strip suitable for locating a windshield washer valve 9. The valve assembly is held onto the parting strip 8 by means of two set-screws 10, one on each side. A valve adjustment screw 11 is unscrewed from the valve assembly 9 while attaching the device on the car. The stem or screw 11 is placed through a hole from the inside of the car and screws into the valve assembly 9. If necessary, the stem 11 may be placed through a hole which was originally intended for one of the screws which hold the parting strip together. A ⅛" drill may be drilled through the parting strip 8 and the tube 7 may be shortened or bent to provide the proper shape and adjustment. The valve assembly 9 is preferably provided with two orifices 12, one on each side, and the valve stem 11 is made to open and close these outlets by means of a quarter or half turn. One advantage of this windshield washer, as compared with the standard vacuum operated windshield washer under the hood, is that it will not fail to operate when the car is going up a steep hill where the motor is heavily loaded. Most of the standard vacuum operated washers fail to operate under this condition unless there is a let up on the accelerator to give the vacuum a chance to operate. If desired an automatic cut-off for the water may be provided and such an automatic cut-off could be made to operate after a few seconds from the time it is turned on.

Referring to Figs. 4 and 5, the top sun visor shield 13 is made in the standard shape, except that it may, if desired, be provided with louvres 14 on the top leading edge, as well as on the lower leading edge, to scoop in more air at slow car speeds. The lower half 15 of the visor is provided with a screen 16 along the leading edge, in order to prevent insects from entering the air system. The two halves 13 and 15 form a closed rear section and serve to grip the rear edge of water bags 17 and 18. The front, or leading edge of the bags are suspended on a strong tube 19, which extends from a partition 20 Fig. 4, to a partition 21, and which, is also supported by the center web on a partition 22. The canvas water bags 17 and 18 are provided with filler plugs 23 and 24 respectively. A third reservoir 25, preferably made of some material as aluminum, is also provided with a filler plug 26. This reservoir 25 is the windshield washer reservoir and is provided with a tube 27 and a valve assembly 28 as previously described. The canvas water bag 17 is connected to the canvas water bag 18 by means of a connecting tube 29 and this tube 29 is provided with a drain tube 30, which leads to an outlet spigot 31 inside the car. The spigot 31 is screwed onto the end of the tube 30, which is inserted through a parting strip 32 at a suitable location, such as shown in Fig. 5. The windshield washer reservoir is made separate from the canvas water bags 17 and 18, so that in the winter time the windshield washer reservoir 25 may be filled with anti-freeze solution and it, of course, should be separate from the bags used for cool drinking water. The operation of this four-in-one visor combination is as follows:

Air enters the leading edge of the visor through the louvers 14 and the screen 16 and passes above and below the suspended canvas water bags 17 and 18, where the air is cooled, due to the evaporation from the wet canvas material and is forced into the car on one or both sides, as shown in Fig. 4. Cool drinking water may be drawn from the spigot 31 inside the car into a suitable plastic or paper cup, for instance, while the car is in motion.

The windshield washer as shown in Fig. 3 is easily installed on a windshield visor 41 of Figs. 1 and 2 by merely inserting or placing the hooks 3 and 4 over the upper or back edge of the visor with the reservoir or tank 1 on the underside of the visor and then placing the hook 5 over the front edge of the visor after which the turnbuckle 6 is turned until the rod 40 is under tension. The tube 7 is then secured to the parting strip 8 by means of screws 10 with the valve screw 11 placed through a small perforation through the parting strip. When thus installed the windshield cleaner may be operated by opening valve 11 to permit streams of water to flow from the holes 12 onto the windshield whereby when the usual wipers, not shown are reciprocated the windshield will be cleaned.

The form of the invention of Figs. 4 and 5 the structure operates not only to clean the windshield but also to supply drinking water to occupants of the car and to provide cooled air into the interior of the car. In addition the device operates to wash the windshield. The airflow through the windshield visor and finally into the interior of the car is similar to the airflow through the cooler in the visor as shown and described in my co-pending application Serial No. 42,106, filed August 2, 1948. In the present structure the airflow through the visor is not forced through a constantly moistened fabric and the like but the air due to the forward speed of the car, is forced through the screen 16 assisted by the baffles 14. The air flow follows the direction of the arrows past the moist bags or reservoirs 17 where due to evaporation the air is cooled and is finally directed into the interior of the car by passages 43. The air flowing past the reservoirs 17 and 18 also cool the water therein which can be used for drinking purposes by opening valve 31. When it is desired to clean the windshield valve 42 may be opened to permit the water in the reservoir 25 to flow onto the windshield to the amount desired.

In the structure of Figs. 1 to 3 the water tank may be applied as an attachment to a windshield visor by means of clamps, whereas the structure of Figs. 4 and 5 is a built-in design with a special internal structure for the visor.

I claim as my invention:

1. A combination windshield visor and air cooler for automobiles and the like comprising a visor casing having an opening along the front edge thereof for entry of air and an opening at at least one rear end of the visor to direct the air entering the front opening from the interior of the visor and into the automobile, and at least one fabric water reservoir in the visor casing in the path of the air stream.

2. A combination windshield visor and air cooler for automobiles and the like comprising a visor casing having an opening along the front edge thereof for entry of air and an opening at at least one rear end of the visor to direct the air entering the front opening from the interior of the visor and into the automobile, at least one fabric water reservoir in the visor casing in the path of the air stream, and a second water reservoir mounted in the visor and having a pipe connection to the inside of the automobile.

3. A combination windshield visor, and air cooler for automobiles and the like comprising a visor casing having an opening along the front edge thereof for entry of air and an opening at at least one rear end of the visor to direct the air entering the front opening from the interior of the visor and into the automobile, at least one fabric water reservoir in the visor casing in the path of the air stream, and a second water reservoir mounted in the visor and having a pipe connection to the inside of the automobile and fitted with a valve to control the flow of water from the second-mentioned reservoir.

4. A combination windshield visor and air cooler for automobiles and the like comprising a visor casing having an opening along the front edge thereof for entry of air and an opening at at least one rear end of the visor to direct the air entering the front opening from the interior of the visor and into the automobile, and at least one fabric water reservoir in the visor casing in the path of the air stream, said casing being provided with a plurality of louvers on the leading edge of the visor to aid in guiding the air into the interior of the visor casing.

5. A combination windshield visor, washer and air cooler, according to claim 2, in which a filler cap is provided for each reservoir to refill the reservoirs with a supply of water.

6. A combintaion windshield visor and air cooler for automobiles and the like comprising a visor casing having an opening along the front edge thereof for entry of air and an opening at at least one rear end of the visor to direct the air entering the front opening from the interior of the visor and into the automobile, and a plurality of fabric water reservoirs permitting moisture to seep through the fabric whereby the air streaming past the fabric will cool the latter by evaporation.

EDWIN E. FOSTER.

References Cited in the file of this patent

UNITED STATES PATENTS

| Number | Name | Date |
|---|---|---|
| 1,780,502 | Otto | Nov. 4, 1930 |
| 1,949,753 | Meadows | Mar. 6, 1934 |
| 2,229,815 | Nerbovig | Jan. 28, 1941 |
| 2,253,353 | Sharp | Aug. 19, 1941 |
| 2,334,856 | Atkinson | Nov. 23, 1943 |